United States Patent [19]

Fiala

[11] 4,438,664
[45] Mar. 27, 1984

[54] SYSTEM FOR OPERATING THE DRIVE OF A VEHICLE

[75] Inventor: Ernst Fiala, Wolfsburg, Fed. Rep. of Germany

[73] Assignee: Volkswagenwerk Aktiengesellschaft, Fed. Rep. of Germany

[21] Appl. No.: 304,662

[22] Filed: Sep. 22, 1981

[30] Foreign Application Priority Data

Sep. 26, 1980 [DE] Fed. Rep. of Germany ....... 3036327

[51] Int. Cl.³ .............................................. B60K 41/14
[52] U.S. Cl. ........................................ 74/866; 74/857; 74/877; 74/878; 192/0.096
[58] Field of Search ................. 74/857, 858, 865, 866, 74/877, 878; 192/0.096, 0.076

[56] References Cited

U.S. PATENT DOCUMENTS 4,253,347 3/1981 Mizumo et al. ...................... 74/866
4,342,298 8/1982 Ganoung ............................. 74/877
4,353,272 10/1982 Schneider et al. .................... 74/866
4,392,394 7/1983 Hofbauer et al. .................... 74/689

FOREIGN PATENT DOCUMENTS 2301776 2/1976 Fed. Rep. of Germany .

Primary Examiner—Leslie A. Braun
Assistant Examiner—Joseph M. Rolnicki
Attorney, Agent, or Firm—Brumbaugh, Graves, Donohue & Raymond

[57] ABSTRACT

A system is provided for fuel-efficiently operating an engine in a vehicle wherein the vehicle engine is coupled through a clutch to an infinitely variable ratio gear driving a planetary gear train. A clutch pedal actuates the clutch, and an accelerator pedal is coupled to the fuel delivery mechanism of the engine. A first storage unit is responsive to the position of the accelerator pedal and selects a stored value for the ratio of the infinitely variable ratio gear. A drive unit is provided for adjusting the ratio of the infinitely variable gear in response to the selected value from the first storage. A second storage unit is responsive to the position of the accelerator pedal and selects a stored value for a fuel delivery mechanism. A third storage unit is responsive to the position of the clutch pedal and selects a stored value for the fuel delivery mechanism. A comparison unit is coupled to the second and third storage units for selecting the smaller of the values for the fuel delivery mechanism. A drive unit is provided for adjusting the fuel delivery mechanism in response to the value selected by the comparison unit.

5 Claims, 4 Drawing Figures

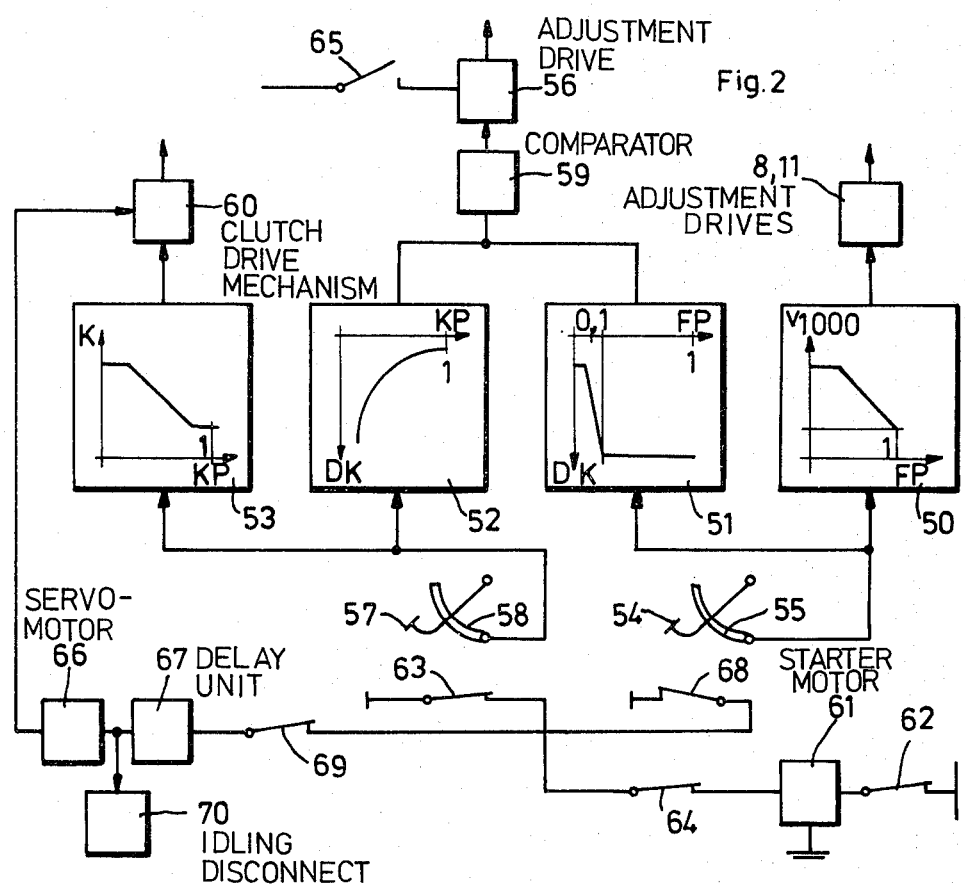
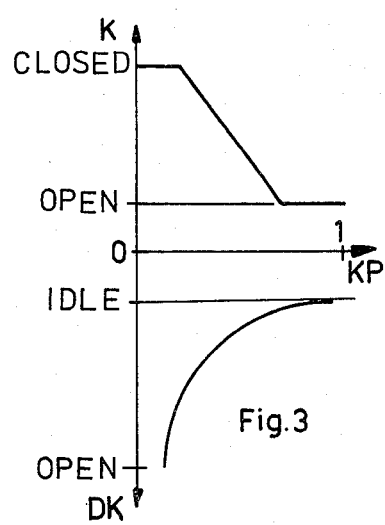
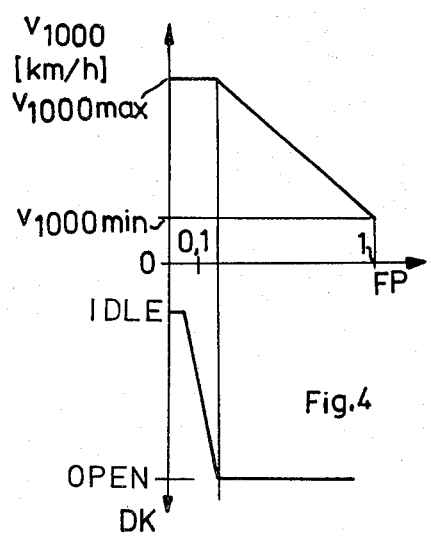

SYSTEM FOR OPERATING THE DRIVE OF A VEHICLE

BACKGROUND OF THE INVENTION

This invention relates to drives for vehicles, and more particularly, to a novel system for setting the engine speed, the clutch, and the gear ratio of an infinitely variable transmission.

An infinitely variable gear ratio transmission is disclosed in German patent application No. P 29 44 928.3, B60K 17/00, corresponding to U.S. Pat. No. 4,392,394, issued on July 12, 1983 to Hofbauer et al., wherein the internal combustion engine is transversely positioned in the vehicle while the planetary gear and the differential gear unit are positioned concentrically.

German patent application No. 23 01 776, B60K 41/14 discloses a control system for a drive train comprising an internal combustion engine and a traction organ drive, such as a belt wrap gear. In the disclosure, the accelerator pedal acts not only on the fuel delivery or apportioning mechanism of the engine, generally a throttle valve, but also on the control slide of a slide valve that changes the transmission gear ratio of the belt wrap gear. The accelerator pedal, acting through the slide valve, and a centrifugal governor both operate on the belt wrap gear via an adjusting lever that controls the gear ratio. By adjusting the ratio of the transmission in response to the torque demanded from the internal combustion engine and the actual engine speed, improved fuel consumption is achieved by providing a given engine speed with each torque. However, this application neither discloses a clutch coupling the transmission to the engine, nor how such a clutch would be actuated.

SUMMARY OF THE INVENTION

A system for operating a vehicle drive is provided in which the drive has an internal combustion engine coupled through a clutch to an infinitely variable transmission, the gear having input cone pulleys and output cone pulleys and driving a planetary gear train for imparting motive power to an axle, a clutch pedal for actuating the clutch, and an accelerator pedal coupled to the fuel delivery mechanism of the engine. The system includes a control signal generator for controlling the infinitely variable transmission and includes a first storage component responsive to the position of the accelerator pedal which selects a first stored value corresponding to the gear ratio of the infinitely variable transmission. A servomotor is provided for adjusting the gear ratio of the infinitely variable transmission in response to the selected value. A second storage component is provided that is responsive to the position of the accelerator pedal and selects a second stored value for the fuel delivery mechanism. A third storage component is provided responsive to the position of the clutch pedal and selects a third stored value for the fuel delivery mechanism. A comparator is coupled to the second and third storage components and selects the smaller of the second and third values. A servomotor is provided for adjusting the fuel delivery mechanism in response to the value selected by the comparison means.

It is a purpose of the invention to provide a system so that by simple actuation of the accelerator pedal and the clutch pedal, the engine will operate at its most favorable fuel consumption.

One advantage of the present invention resides in its use of commercially available components, such as storage units, switches, and pedal position sensors.

BRIEF DESCRIPTION OF DRAWINGS

A more complete understanding of the invention and its advantages will be apparent from the following Detailed Description taken in conjunction with the accompanying drawings in which:

FIG. 2 is a diagramatic representation of a control system according to the present invention;

FIG. 3 illustrates, in the upper diagram, the state of the clutch as a function of the position of the clutch pedal, and, in the lower diagram, the setting of the throttle as a function of the position of the clutch pedal;

FIG. 4 illustrates, in the upper diagram, the transmission ratio required to maintain a constant engine speed as a function of the position of the accelerator pedal, and, in the lower diagram, the setting of the throttle as a function of the position of the accelerator pedal.

DETAILED DESCRIPTION

Figure 1:
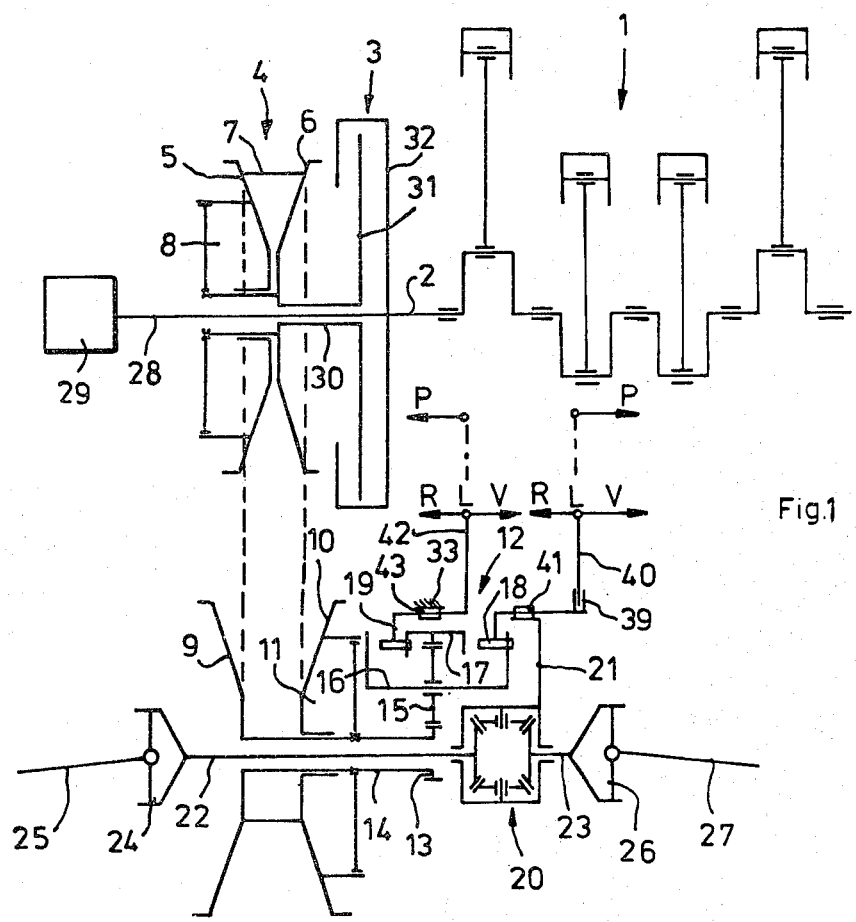
FIG. 1 is a diagramatic representation of a drive structure of a vehicle including an engine coupled to an infinitely variable transmission through a clutch, with the wheels driven through a planetary gear train.

In FIG. 1 of the drawings, 1 designates a driving engine, e.g., a four-cylinder reciprocating piston engine, whose crankshaft 2 is connected by means of a first clutch 3 with the drive cone pulleys 5, 6 of a chain or belt wrap gear 4. Numeral 7 designates the traction organ, such as a V-belt or a chain, which transmits the torque of the engine 1 to the output cone pulleys 9, 10 of the belt wrap gear 4. Numeral 8 designates the control motor, operating, e.g., hydraulically, for mutual displacement of the pair of drive cone pulleys 5, 6. Numeral 11 designates the hydraulic control motor associated with the output cone pulley pair 9, 10.

Numeral 12 indicates a planetary gear system connected to the belt wrap gear 4. It is composed of a simple planetary gear set which is designed as an axle transmission and reversing gear. A sun gear 13 of the planetary gear system 12 is connected via a hollow shaft 14 with the output cone pulleys 9, 10 of the belt wrap gear 4. The sun gear 13 meshes with the planet gears 15 supported by a planetary gear carrier 16. Planet gears 15 mesh with an inner-toothed ring gear 17. Numeral 18 is a sliding sleeve of a first clutch designed as a simple jaw clutch coupling in the exemplary embodiment. Clutch 18 connects the drive gear 21 of a successive differential gear 20 with either the planetary gear carrier 16 or the ring gear 17 of the planetary gearing system 12. A second clutch 19, preferably a sliding sleeve, connects the ring gear 17 or the planetary gear carrier 16 with the stationary housing 33.

Axle shafts 22 and 23 lead from the differential gear 20 and, by way of articulations 24 and 26, connect with the articulated shafts 25 and 27 leading to the wheels.

Hydraulic pump 29 is driven by shaft 28 connected to the crankshaft 2 and powers, e.g., the adjustment means 8 and 11 for the drive and output cone pulleys of the belt wrap gear 4. In the illustrated embodiment, the shaft 28 passes centrally through the hollow shaft 30 constituting the connection of the drive cone pulleys 5, 6 with the driving plate 31 of the first disconnecting clutch 3 and is connected directly with the coupling or flywheel plate 32 driven by the crankshaft 2.

A fork 39 engaged by control lever 40 actuates the first sliding sleeve 18 which moves in a bearing 41 on the drive gear 21. The second sliding sleeve 19 can be easily actuated as the sleeve 19 slides in a bearing 43 of the stationary housing 33, and is rigidly connected with a control lever 42. In the position shown in the drawing, the forward drive is engaged whereby the ring gear 17 engages the control sleeve 19 and is rigidly connected with the housing 33. The planetary gear carrier 16 is connected by means of the control sleeve 18 with the drive gear 21 of the differential gear in a torsion-resistant manner. Control levers 40 and 42 may be displaced to the left from the illustrated position, wherein the operating sleeves fully release the control elements of the planetary gear system. On further displacement to the left, the control sleeve 18 connects the drive gear 21 of the differential gear 20 with the ring gear 17 of the planetary gear system 12. The second control sleeve 19 fixes the planetary gear carrier 16 through connection with the housing 33. This results in the reverse operation of the vehicle. To engage the forward drive as well as the reverse drive, the control levers 40 and 42 each are actuated in the same direction.

Actuation of the control levers in opposite directions results in a parking lock since the two control sleeves act on the like element of the planetary gear system. In this position, the drive gear 21, and accordingly the driving wheels of the vehicle, are connected either via the planetary gear carrier 16 or via the ring gear 17 of the planetary gear system 12 directly with the stationary housing 33.

The quantity $V_{1000}$, is the speed of the vehicle at the prevailing transmission ratio of the belt drive 4 as adjusted by the adjustment drives 8 and 11, and with the engine running at 1000 rpm, assuming no slippage in the drive assembly. Thus, the first storage component 50 transmits orders to set the adjustment drives 8 and 11 in accordance with the prevailing actuation signals generated by a potentiometer 55 indicating the accelerator pedal position.

The storage components 51, 52 are associated with a drive 56 for setting the fuel delivery mechanism of the engine 1, typically the throttle valve position. The second storage component 51 contains data indicating the adjustment of the throttle valve position DK as a function of the position FP of the accelerator pedal 54. The third storage component 52 contains data indicating the adjustment of the position DK of the throttle valve as a function of the position KP of the clutch pedal 57. The numeral 1 indicates that the pertinent pedal has moved to its fully depressed position.

The second storage component 51 also receives signals from the potentiometer 55 associated with the accelerator pedal 54, but the third storage component 52 receives signals from a potentiometer 58 associated with the clutch pedal 57. A comparison unit or comparator 59 is disposed between the outputs of the storage components 51, 52 and selects the smaller of the signals output by the storage components 51, 52 for delivery to the adjustment drive 56. Accordingly, the drive 56 opens the throttle valve by the smaller of the values output from storage components 51, 52.

The fourth storage component 53 stores data indicating the state K of the clutch 3 as a function of the clutch pedal position KP. The fourth storage component 53 sends signals to a drive mechanism 60 to actuate the clutch 3.

An electric starter motor 61 is provided, in the customary manner, to start the engine 1. The starter motor is actuated via the ignition lock switch 62. For reasons explained below, the circuit for the starter motor 61 includes two switches 63 and 64 connected in series. The switch 63 is closed when the clutch pedal 57 has been depressed a relatively large amount of its travel, for example, 80 percent of the maximum pedal path. The switch 64 is closed when the vehicle speed is below a relatively low maximum value, for example, 25 kilometers per hour.

For a better understanding of the following description of the manner of operation of the control system in the aforedescribed embodiment, FIGS. 3 and 4 show once more the effects of displacements of the clutch pedal (clutch pedal position KP) and the accelerator pedal (accelerator pedal position FP) on the clutch position K, the throttle valve position DK, and the vehicle speed $V_{1000}$.

The above embodiment operates as follows:

Engine Starting

In the neutral or idle position L of the planetary gear train 12, the ignition lock switch 62 is closed and the internal combustion engine 1 is started in the customary manner by the electric starter motor 61. By way of the actuated accelerator pedal 54, the second storage component 51 is actuated to deliver setting signals for the throttle valve adjustment drive 56. The clutch pedal 57 is not depressed, so that on starting, the position of the throttle valve is controlled by operation of the accelerator pedal 54.

Starting Forward Movement

First, the clutch pedal 57 is depressed so that the throttle valve is set to idle the engine and the clutch 3 is disengaged. Thereafter, the planetary gear train 12 is shifted to the forward drive position V.

Since now, in accord with FIG. 3, the smallest setting signals come from the third storage component 52, the movement of the accelerator pedal to its fully depressed position (indicated by the numeral 1 in FiG. 4) causes merely an adjustment or shifting of the transmission of the belt wrap gear 4, namely in a manner causing the minimum value $V_{1000\ min}$ of the stored speed, for example, 7 kilometers per hour, to occur.

As soon as the clutch pedal 57 is released, the throttle valve opens fully. At this starting forward process, the throttle valve position, and therefore the starting speed and acceleration are controlled solely by the actuation of the clutch pedal 57. This is because the setting signals from the third storage component 52 are smaller than the signals from the second storage component 51.

After the clutch pedal 57 returns to its rest position, the vehicle accelerates. The gear ratio corresponding to the velocity of $V_{1000\ min}$ is set by the actuation of the accelerator pedal 54. This is the equivalant of a low gear. The belt wrap gear 4 remains thus until the upper speed limit of the internal combustion engine 1 is attained. This may correspond, for example, to 5,000 rpm and 35 kilometers per hour. The driver ordinarily then releases the accelerator pedal 54 so that the maximum rotational speed of the internal combustion engine is maintained. The vehicle continues to accelerate by virtue of the belt wrap gear ratio changing to a ratio corresponding to a higher gear to the ratio indicated at $V_{1000\ max}$. There the maximum speed is attained. If the acceleration is to be smaller, the operator releases the accelerator pedal such that acceleration occurs with partial power, i.e., through a reduction in the rotational speed as a result of a change in the gear ratio of the transmission. On further accelerator pedal release, with the engine only partly loaded (in the range of an accelerator pedal position of 10% of the total movement as shown in the horizontal upper limit of the $V_{1000}$ curve), acceleration decreases further until the desired speed or acceleration is attained. If the output is still too large, the operator can lightly depress the clutch pedal 57.

Deceleration

To decelerate the vehicle, the accelerator pedal 54 is fully released whereby, in accord with FIG. 4, the transmission ratio of the belt wrap gear 4 is changed so that the gear ratio corresponding to $V_{1000\ max}$ is obtained (e.g., highest gear). At the same time, the throttle valve is moved into its idling position. The speed $V_{1000\ max}$ is maintained until the lower speed limit of the internal combustion engine is attained. The clutch must then be disengaged.

Motor Braking

For motor braking, a switch 65 in the planetary gear train 12 maintains the throttle valve in the idling position when levers 40 and 42 of FIG. 1 are in the forward position and the transmission ratio of the belt drive 4 corresponds to a low gear. If the accelerator pedal is actuated, the transmission ratio of the belt wrap gear 4 can be changed without changing the position of the throttle valve.

In the arrangement shown in FIG. 2, further measures have been taken in order to ensure the maximum automation, and thereby independence of actuation, of the drive, e.g., if the operator while driving takes actions which are unfavorable to fuel consumption.

The storage component 53 generates signals for setting clutch drive 60. This can be bypassed by the motive means or servomotor 66 which, under defined conditions, is actuated by accelerator pedal 54 action. The servomotor 66 can be constructed in a manner well known. When it is activated, it is acted on in response to the vacuum in the suction pipe of the internal combustion engine 1 and issues a disengagement command to the clutch drive 60. This will occur whenever the accelerator pedal 54 is not actuated for a time predefined by a delay unit 67 or was activated only to a very small extent. If the accelerator pedal 54 is depressed 10 percent or less of its entire travel path, switch 68, connected in series with a vehicle-speed-dependent switch 69, is closed. If the speed V of the vehicle is larger than a predefined minimum value $V_X$, for example, 25 kilometers per hour and corresponding to 500 rpm, the internal combustion engine 1 is separated from the wheels of the vehicle by a delayed disengagement of the clutch 3. At the same time, an idling disconnect device 70 is actuated so that the internal combustion engine 1 stops running. The clutch 3 thus has the effect of an overrunning clutch. Senseless fuel consumption during the travel of the vehicle by idling of the internal combustion engine is eliminated.

There are two methods of starting the internal engine after it has been turned off which must be selected as a function of the travel speed. If the speed of the vehicle exceeds a preset speed, $V_X$, for example, 25 kilometers per hour, and if the accelerator pedal 54 is depressed sufficiently so that the switch 68 opens, the clutch 3 is again engaged so that the internal combustion engine 1 is started through the vehicle motion imparted through the transmission. This occurs at $V_{1000\ max}$.

If the speed is below $V_X$, or if stoppage has occurred, both the accelerator pedal 54 and the clutch pedal 57 must be depressed simultaneously. The switches 63, 64 connected in series with the circuit for the starter motor 61 are closed so that the internal combustion engine 1 is started electrically and, as a result of the depressed accelerator pedal 54, continues to run. The accelerator pedal position determines a preset relationship between the speed of the vehicle and the revolutions per minute of the engine 1. When starting the vehicle or at smaller speeds, the accelerator pedal 54 must be depressed further.

Accordingly, a vehicle equipped with the present invention selects data stored in components which optimize fuel consumption. This is especially true when the stored data set the throttle of the engine so that it operates at its most efficient speed.

While an embodiment of the present invention has been disclosed herein, various further modifications may be made without departing from the spirit and scope of the invention.

I claim:

1. In a vehicle drive having an internal combustion engine coupled through a clutch to an infinitely variable transmission, the transmission having input cone pulleys and output cone pulleys and driving a reversible planetary gear train for imparting motive power to an axle, a clutch pedal for acutating the clutch, and an accelerator pedal coupled to the fuel delivery mechanism of the engine; a system for operating the drive comprising:

control signal generating means for controlling the infinitely variable transmission and including first storage means responsive to the position of said accelerator pedal for selecting a first stored value corresponding to a gear ratio of said infinitely variable transmission according to a plot of gear ratio vs. accelerator pedal position;

means for adjusting the gear ratio of said infinitely variable transmission in response to said selected value;

second storage means responsive to the position of said accelerator pedal for selecting a second stored value for said fuel delivery mechanism according to a plot of said second stored value vs. accelerator pedal position;

third storage means responsive to the position of said clutch pedal for selecting a third stored value for said fuel delivery mechanism according to a plot of said third stored value vs. clutch pedal position;

comparison means coupled to said second and third storage means for selecting the smaller of said second and third stored values for said fuel delivery mechanism; and means for adjusting said fuel delivery mechanism in response to said value selected by said comparison means.

2. The system of claim 1 and further comprising:

a motive means for disengaging said clutch;

means for actuating said motive means;

a first switch means connected in circuit with said actuating means for enabling actuation of the motive means at deflections of said accelerator pedal below a preset small value; and a second switch means connected in circuit with said actuating means and said first switch means for enabling actuation of the motive means when said vehicle speed exceeds a preset value, said first and second switch means being connected to cause the motive means to actuate when both the deflection of said accelerator pedal is below said preset small value and the speed of said vehicle exceeds said preset value.

3. The system of claim 2 and further comprising:
an idling disconnect means coupled to said engine; and
means connecting the idling disconnect means for actuation of the idling disconnect substantially as said clutch disengaging motive means is operated by said first and second switch means.

4. The system of claim 3 wherein said means connecting the idling disconnect means for actuation of the idling disconnect comprises means connecting the idling disconnect means with the first and second switch means.

5. The system of claim 4 and further comprising:
a starter motor coupled to said engine;
first starter switch means connected in circuit with said starter motor for enabling actuation of the starter motor at deflections of said clutch pedal beyond a predetermined position; and
second starter switch means connected in circuit with said starter motor and said first starter switch means for enabling actuation of the starter motor when said vehicle travels below a predetermined speed, said first and second starter switch means being connected to cause the starter motor to actuate when both the deflection of said clutch pedal is beyond said predetermined position and said vehicle travels below said predetermined speed.

* * * * *